(12) United States Patent
Lai

(10) Patent No.: US 6,899,407 B1
(45) Date of Patent: May 31, 2005

(54) DEVICE FOR QUICKLY DETACHING AND REASSEMBLING THE FRONTMASK OF A COMPUTER CASING

(75) Inventor: Vincent Lai, Taoyuan Hsien (TW)

(73) Assignee: In Win Development, Inc., Taoyuan Hsien (TW)

( * ) Notice: Subject to any disclaimer, the term of this patent is extended or adjusted under 35 U.S.C. 154(b) by 0 days.

(21) Appl. No.: 10/829,587

(22) Filed: Apr. 21, 2004

(51) Int. Cl.[7] .............................................. A47B 97/00
(52) U.S. Cl. ................................. 312/223.2; 312/265.6
(58) Field of Search .......................... 312/223.1, 223.2, 312/265.5, 265.6, 257.1; 361/724, 725, 683

(56) References Cited

U.S. PATENT DOCUMENTS

| | | | | |
|---|---|---|---|---|
| 5,825,626 | A | * | 10/1998 | Hulick et al. ................ 361/724 |
| 5,997,115 | A | * | 12/1999 | Radloff et al. ............... 312/222 |
| 6,209,975 | B1 | * | 4/2001 | Lai ........................... 312/223.2 |
| 6,296,333 | B1 | * | 10/2001 | Lee et al. .................. 312/223.2 |
| 6,356,436 | B1 | * | 3/2002 | Buican et al. ............... 361/683 |
| 6,555,747 | B2 | * | 4/2003 | Chen et al. ................. 174/52.1 |

FOREIGN PATENT DOCUMENTS

EP                425170        * 5/1991

* cited by examiner

Primary Examiner—James O. Hansen
(74) Attorney, Agent, or Firm—Pro-Techtor International Services

(57) ABSTRACT

The invention is a device for quickly detaching and reassembling a frontmask of a computer casing including a movable device. The movable device consists of an anchor, a plurality of sliding clips, two wedge-shaped push-heads, a retraction spring, a handle and some other related parts. Two wedge-shaped push-heads are located on an upper side on both ends of the movable device and have a beveled surface. To detach the frontmask of the casing, the beveled surfaces and the wedge-shaped push-heads of the movable device push the anchoring elements outwards, so that the frontmask can quickly be detached from the computer casing.

2 Claims, 4 Drawing Sheets

DEVICE FOR QUICKLY DETACHING AND REASSEMBLING THE FRONTMASK OF A COMPUTER CASING

BACKGROUND OF THE INVENTION (a) Field of the Invention

The invention is a device for quickly detaching and reassembling a frontmask of a computer casing. In a lower part on an inner side of the computer casing a movable device is installed.

(b) Description of the Prior Art

With prior embodiments of frontmasks one had to use a lot of screws, a screw driver and other tools to assemble the frontmask and the casing of the computer. For detaching the frontmask, every single screw has to be taken out again with the screwdriver.

Detaching and reassembling a frontmask in this way is very laborious and time-consuming, and impedes an efficient and large scale production.

SUMMARY OF THE INVENTION

The primary objective of the invention consists of a movable device. When a frontmask is assembled with a casing of a computer, one only has to pull a handle and a beveled surface of a push-heads lifting anchoring elements of the frontmask and wedge-shaped push-heads push the anchoring elements outwards. This allows a practical, simple and quick detaching of the frontmask. The movable device consists of an anchor, a plurality of sliding clips, two wedge-shaped push-heads, a retraction spring, a handle and some other related parts. The anchor locks in a designated hole in a bottom of the computer casing. The sliding clips, located on both ends of the movable device, are inserted into the guideway of a slide bar and can be moved along the slide bar. The two wedge-shaped push-heads are located on an upper side on both ends of the movable device and have a beveled surface.

To detach the frontmask of the casing, one has to pull the handle whereby the retraction string will be stretched. Due to the beveled surface of the pushheads the anchoring elements of the frontmask get lifted and the holes in the anchoring elements get detached from the hooks of the computer casing. The wedge-shaped push-heads of the movable device push the anchoring elements outwards and the frontmask of the casing can now be detached thereby allowing a quick, simple and practical detaching of the frontmask of the computer casing.

DETAILED DESCRIPTION OF THE PREFERRED EMBODIMENTS

Figure 1:
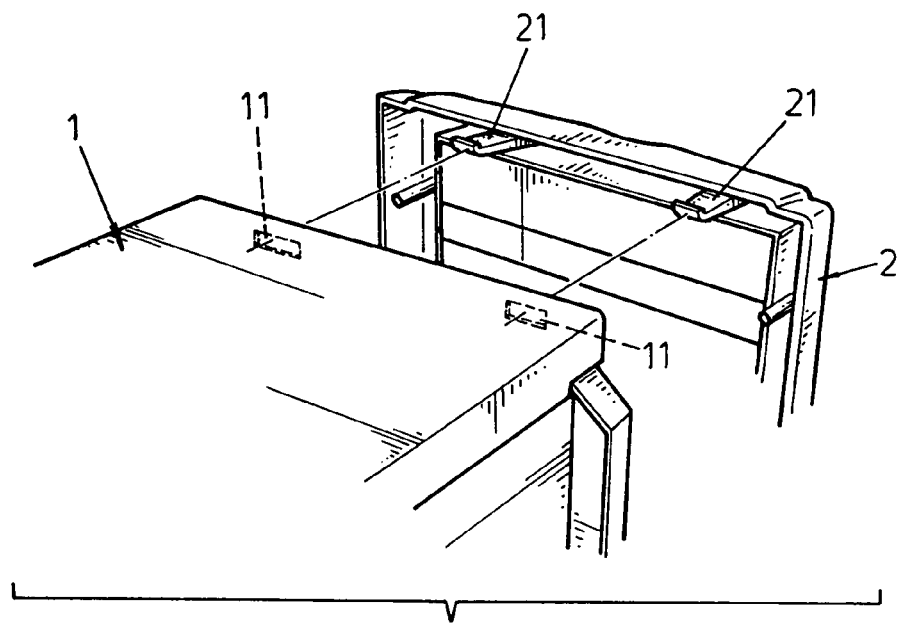
FIG. 1 shows an exploded view of the upper part of the computer casing and the frontmask according to the invention.

As shown in FIG. 1, an upper part of a computer casing 1 includes two holes 11, and the corresponding upper part of the frontmask 2 is provided with two hook-shaped clips 21. The hook-shaped clips 21 can be inserted and fixed in the holes 11.

Figure 2:
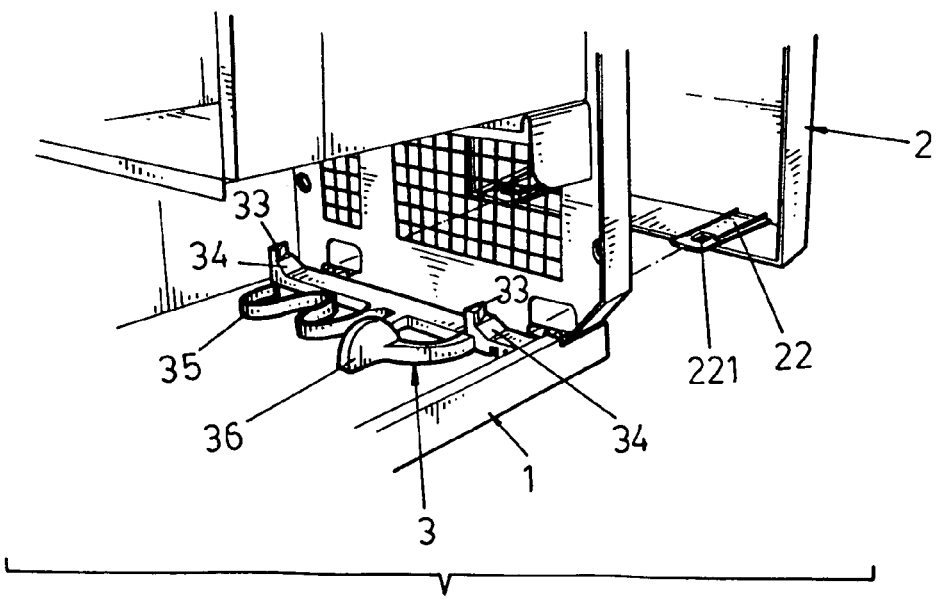
FIG. 2 shows an exploded view of the lower part of the computer casing and the frontmask according to the invention.
Figure 3:
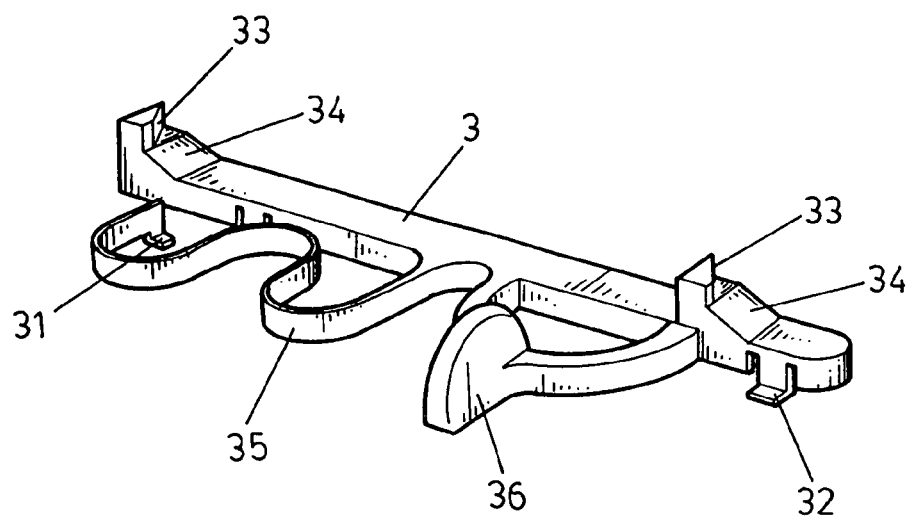
FIG. 3 is a perspective view of the movable device according to the invention.
Figure 4:
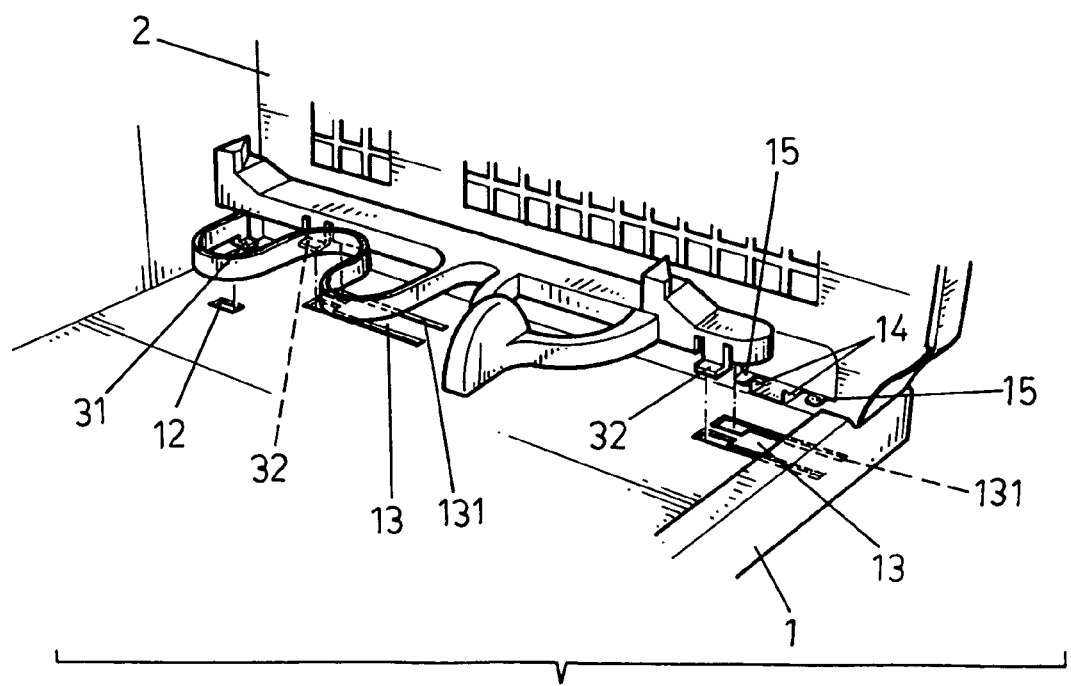
FIG. 4 shows a perspective view of the movable device and of the lower part of the computer casing according to the invention

The feature of the invention as shown in FIG. 1 and FIG. 2, a movable device 3 is installed on the base inside of the computer casing 1. The movable device 3 has a curved shape. Turning to FIG. 4, on one end of the movable device 3 is an anchor 31, which can be inserted and fixated in a hole 12 to the base of the computer casing 1. On both ends of the movable device 3, each on a left and on a right side, a reverse L-shaped sliding clip 32 is mounted. The sliding clips 32 are inserted in a guideway 131 of a slide bar 13 in the base of the computer casing 1. The sliding clips 32 can easily be moved left and right along the slide bar 13. Two wedge-shaped push-heads are located on an upper side on both ends of the movable device 3. On each side, located beneath the wedge-shaped pushheads, is a beveled surface. The retraction spring 35 is installed on a side surface of the movable device 3. Next to the retraction spring 35, also on the side surface, is an arc-shaped handle 36.

Figure 5:
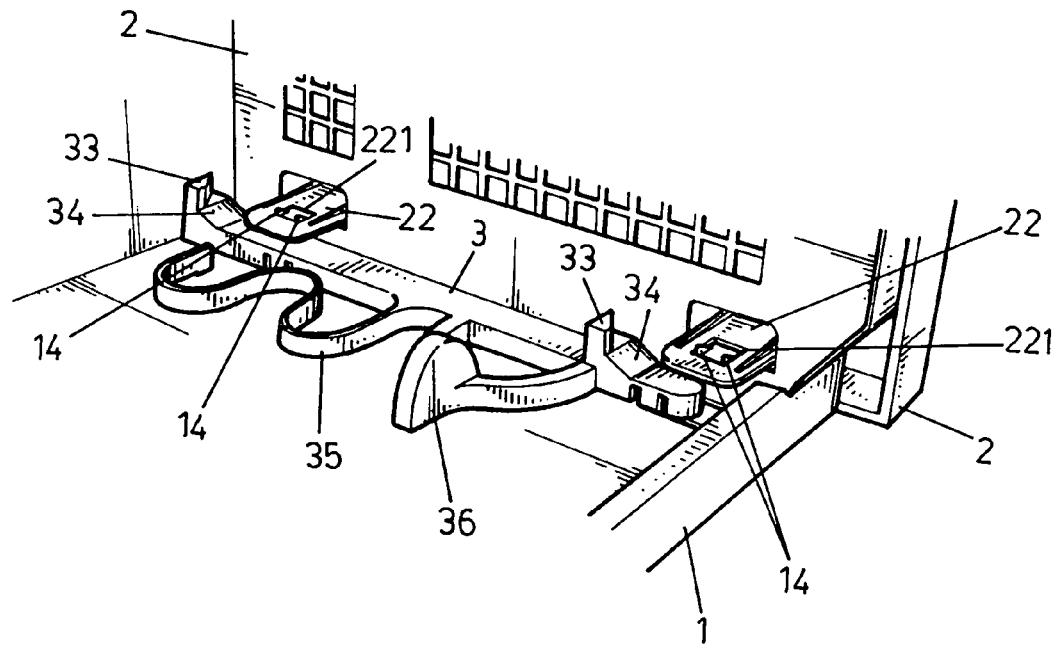
FIG. 5 shows a perspective view of the lower part, when the frontmask is assembled with the casing according to the invention

On each side of a lower part of the computer casing 1 are two hooks 14 and next to the hooks 14 are two support-planks 15. As shown in FIG. 5, two anchoring elements 22 are installed on each side in the lower part on the inner side of the frontmask 2.

Figure 6:
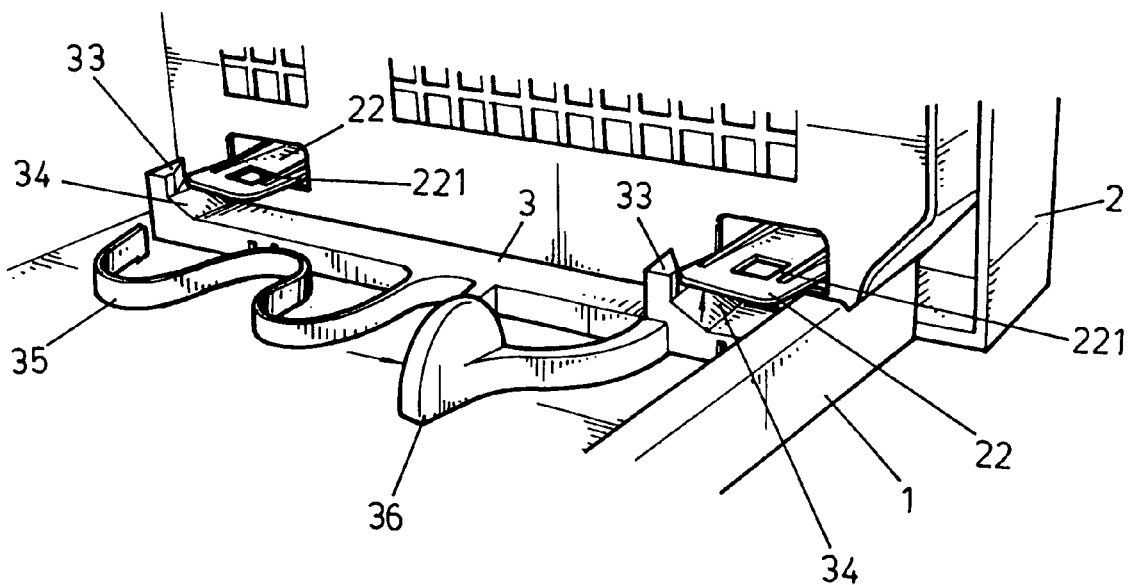
FIG. 6 shows a structural view in assembling state according to the invention.

Two square shaped holes 221 in the anchoring elements 22 on are attached together with the hooks 14 of the computer casing 1. The lower part of the frontmask 2 and the computer casing 1 are fixed together and the two support-planks 15 are enhancing the stability of the anchoring elements 22, which rest on these planks 15. As shown in FIG. 6, to detach the frontmask of the casing 2, one has to pull the handle 36 of the movable device 3, whereby the retraction spring 35 will be stretched and the beveled surfaces 34 lift the anchoring elements 22 of the frontmask 2. By the holes 221 in the anchoring parts 22 are separated from the hooks 14 of the computer casing 1.

Figure 7:
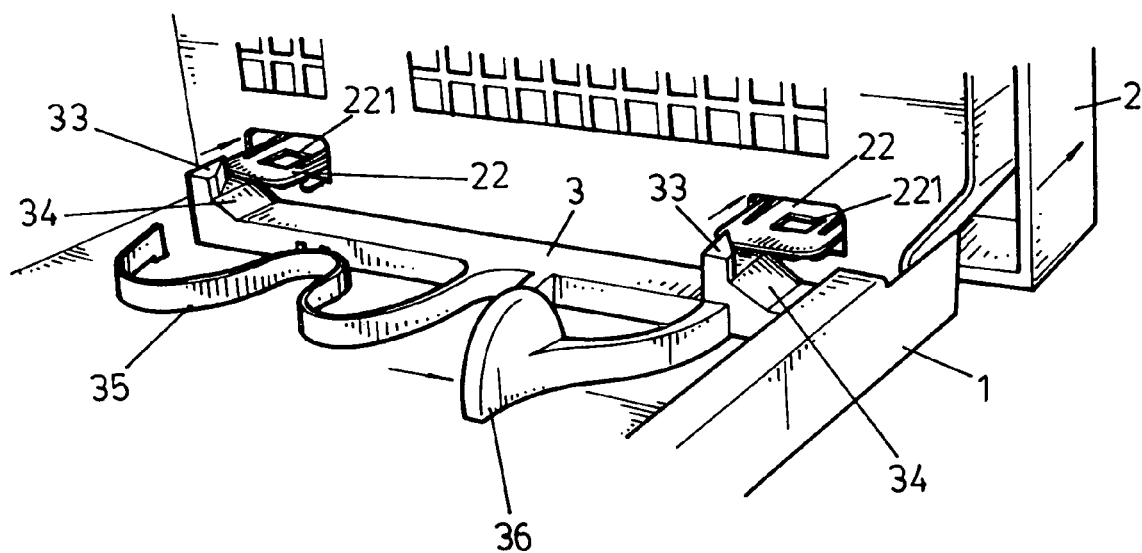
FIG. 7. shows a structural view in assembling state according to the invention.

FIG. 7 shows the wedge-shaped push-heads 33 of the movable device 3 pushing the already lifted anchoring elements 22 outwards. The frontmask 2 can easily be taken off the computer casing 1. By letting go of the handle 36, the retraction spring 35 of the movable device 3 moves back into its original position as shown in FIG. 5.

What is claimed is:

1. An apparatus for quickly detaching and reassembling a front mask of a computer casing comprising:

a frontmask, two anchoring elements installed on an inner side of a lower part of the frontmask, the anchoring elements each having a square shaped hole;

a computer casing having two holes formed in an upper part, said holes fixedly receiving respective hook-shaped clips located on the front mask; and a movable device installed in a lower part of an inner side of the computer casing, a plurality of sliding clips located on opposite ends of the movable device to be received in respective guideways located in the base, an anchor located on the movable device to be received in a hole in the base, a wedge-shaped push-head located on an upper side of each end of the movable device, the push-heads each having a beveled surface on a lower edge thereof, and a retraction spring and handle located on a side surface of the movable device; wherein the holes of the anchoring elements mate with hooks on the computer casing thereby securing the frontmask to the computer casing; wherein, to detach the front mask, a user pulls the handle to stretch the retraction spring so that the beveled surfaces lift the anchoring elements of the frontmask, thereby separating the holes in the anchoring elements from the hooks of the computer casing, while simultaneously the wedge-shaped push-heads of the movable device push the anchoring elements outward, thereby allowing easy removal of the frontmask from the computer casing.

2. The apparatus for quickly detaching and reassembling the frontmask of a computer casing in accordance to claim 1, wherein the wedge-shaped push-heads of the movable device are L-shaped.

* * * * *